(12) United States Patent
Mou et al.

(10) Patent No.: US 11,608,823 B2
(45) Date of Patent: Mar. 21, 2023

(54) MICRO PUMP

(71) Applicant: Microjet Technology Co., Ltd., Hsinchu (TW)

(72) Inventors: Hao-Jan Mou, Hsinchu (TW); Shih-Chang Chen, Hsinchu (TW); Jia-Yu Liao, Hsinchu (TW); Hung-Hsin Liao, Hsinchu (TW); Chung-Wei Kao, Hsinchu (TW); Yung-Lung Han, Hsinchu (TW); Chi-Feng Huang, Hsinchu (TW); Chang-Yen Tsai, Hsinchu (TW); Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 407 days.

(21) Appl. No.: 16/903,089

(22) Filed: Jun. 16, 2020

(65) Prior Publication Data
US 2021/0017976 A1    Jan. 21, 2021

(30) Foreign Application Priority Data
Jul. 17, 2019   (TW) .............................. 108125326

(51) Int. Cl.
*F04B 43/04* (2006.01)
*F16K 99/00* (2006.01)
(Continued)

(52) U.S. Cl.
CPC ........ *F04B 43/046* (2013.01); *F16K 99/0015* (2013.01); *F04B 39/1066* (2013.01);
(Continued)

(58) Field of Classification Search
CPC .. F04B 43/046; F04B 39/1066; F04B 45/047; F04B 53/10; F16K 99/0015; F16K 2099/0094
See application file for complete search history.

(56) References Cited

U.S. PATENT DOCUMENTS 10,047,870 B2 * 8/2018 Wu ........................... F16K 7/12
10,801,489 B2 * 10/2020 Mou ..................... F04B 39/123
(Continued)

FOREIGN PATENT DOCUMENTS

CN          1389639 A      9/2002
CN        101686021 A      3/2010
(Continued)

*Primary Examiner* — Nathan C Zollinger
(74) *Attorney, Agent, or Firm* — Birch, Stewart, Kolasch & Birch, LLP

(57) ABSTRACT

A micro pump is disclosed and includes a fluid-converging plate, a valve membrane, a fluid-outlet plate and a pump core module. The fluid-converging plate includes an inner recess, a protruding portion and a fluid-converging aperture. The protruding portion is disposed at a center of the inner recess. The valve membrane includes a valve aperture. The protruding portion of the fluid-converging plate abuts against the valve aperture. A fluid-converging chamber is formed between the valve membrane and the fluid-converging plate. The fluid-outlet plate in a ring shape includes a fluid-outlet channel. The valve aperture is in fluid communication with the fluid-outlet channel. When the fluid is inhaled into the pump core module, the fluid flows to the fluid-converging chamber through the fluid-converging aperture and then pushes out the valve membrane to flow into the fluid-outlet channel of the fluid-outlet plate through the valve aperture. Thereby the fluid transportation is achieved.

13 Claims, 20 Drawing Sheets

(51) Int. Cl.
*F04B 39/10* (2006.01)
*F04B 53/10* (2006.01)
*F04B 45/047* (2006.01)

(52) U.S. Cl.
CPC ............ *F04B 45/047* (2013.01); *F04B 53/10* (2013.01); *F16K 2099/0094* (2013.01)

(56) References Cited

U.S. PATENT DOCUMENTS

| | | | |
|---|---|---|---|
| 10,865,785 B2* | 12/2020 | Mou | F04B 45/043 |
| 11,536,261 B2* | 12/2022 | Mou | F04B 19/006 |
| 2012/0085949 A1* | 4/2012 | Chen | F04B 43/043 |
| | | | 251/129.01 |
| 2016/0084391 A1* | 3/2016 | Kuribayashi | F16K 15/147 |
| | | | 137/535 |
| 2017/0218937 A1 | 8/2017 | Chen et al. | |

FOREIGN PATENT DOCUMENTS

| | | |
|---|---|---|
| CN | 208017108 U | 3/2017 |
| CN | 107091220 A | 8/2017 |
| CN | 109723626 A | 5/2019 |
| TW | M507977 U | 9/2015 |
| TW | M557308 U | 3/2018 |
| TW | 201817968 A | 5/2018 |

\* cited by examiner

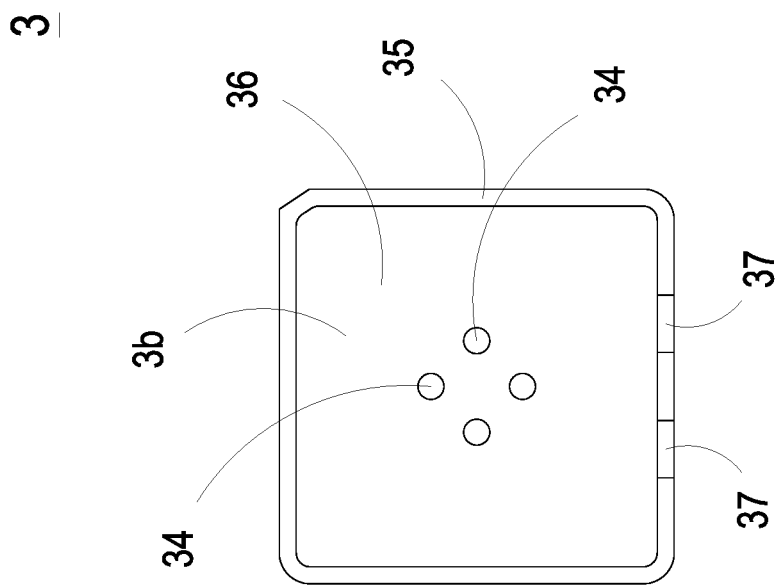
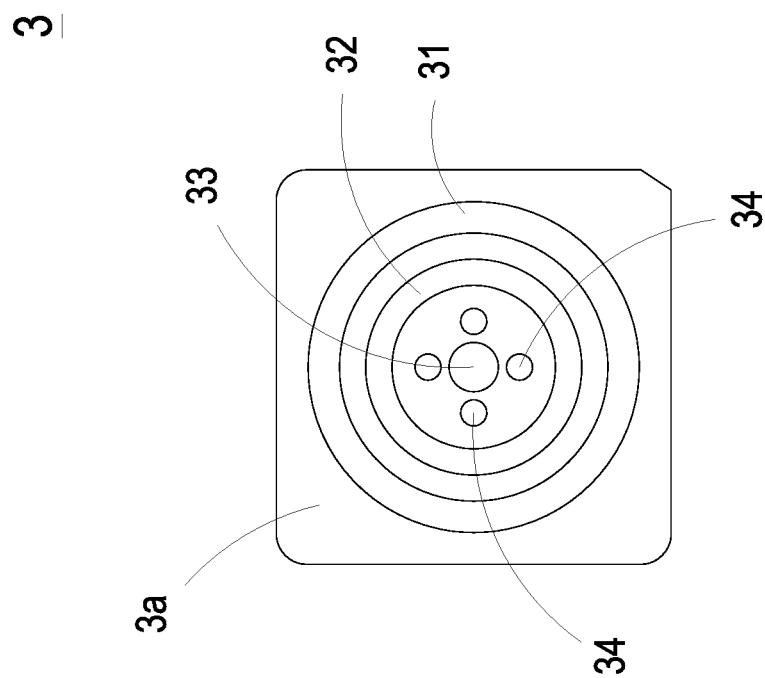
FIG. 5B
FIG. 5A

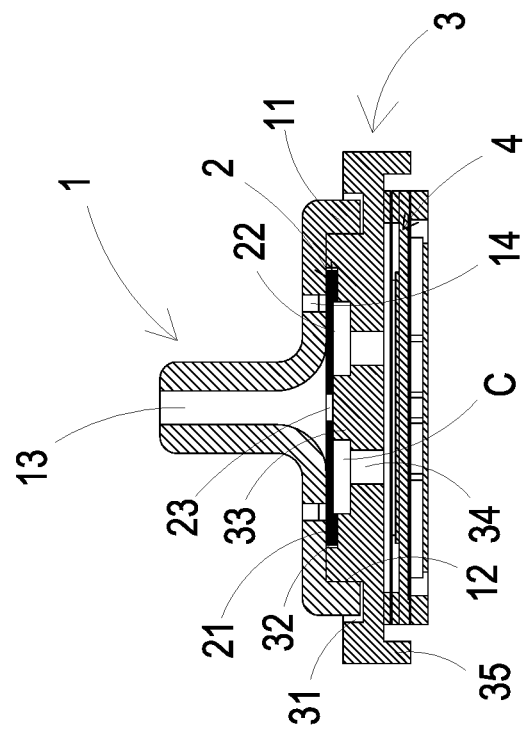
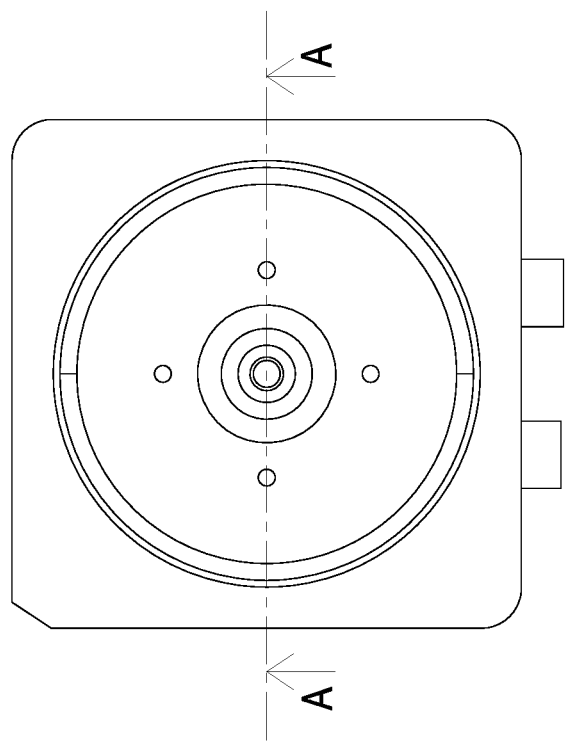

MICRO PUMP

FIELD OF THE DISCLOSURE

The present disclosure relates to a pump, and more particularly to a micro pump which is miniature, silent and transporting fluid at high flow rapidly.

BACKGROUND OF THE DISCLOSURE

Currently, in all fields, the products used in many sectors such as pharmaceutical industries, computer techniques, printing industries or energy industries are developed toward elaboration and miniaturization. The fluid transportation devices are important components that are used in for example micro pumps, micro atomizers, printheads or the industrial printers.

With the rapid advancement of science and technology, the application of fluid transportation device tends to be more and more diversified. For the industrial applications, the biomedical applications, the healthcare, the electronic cooling and so on, even the most popular wearable devices, the fluid transportation device is utilized therein. It is obviously that the conventional fluid transportation devices gradually tend to miniaturize the structure and maximize the flow rate thereof.

Therefore, how to utilize an innovative packaging structure to increase the versatility of a fluid actuating device, has become a main subject of research and an important part of development.

SUMMARY OF THE DISCLOSURE

The object of the present disclosure is to provide a micro pump. By assembling a fluid-outlet plate and a fluid-converging plate with a valve membrane clamped therebetween, a concentric symmetric structure is formed with backstop and unidirectional output, and a pressure relief function is realized. It is beneficial to reduce the structure of the valve membrane greatly, enhance the overall reliability of airtightness, increase the flexibility of the design regarding the output direction, and reduce the flow resistance of pressure relief greatly.

In accordance with an aspect of the present disclosure, there is provided a micro pump. The micro pump includes a fluid-converging plate, a valve membrane, a fluid-outlet plate and a pump core module. The fluid-converging plate has a first surface and a second surface. The first surface and the second surface are two opposite surfaces. The converging plate includes an outer groove, an inner recess, a protruding portion, at least one fluid-converging aperture and a fluid-converging peripheral wall. The outer groove is disposed on the first surface. The inner recess is disposed on the first surface and surrounded by the outer groove. The protruding portion is disposed on the first surface and located at a center of the inner recess. The at least one fluid-converging aperture penetrates the first surface and the second surface, and is disposed in the inner recess and adjacent to an outer edge of the protruding portion. The fluid-converging peripheral wall is disposed on the second surface to define a fluid-converging space. The valve membrane is disposed in the inner recess of the fluid-converging plate and includes a valve aperture disposed at a center of the valve membrane. The protruding portion of the fluid-converging plate abuts against the valve aperture. A fluid-converging chamber is formed between the valve membrane and the fluid-converging plate. The fluid-outlet plate is in a circular shape, and includes a fluid-outlet channel, at least one fluid-relief channel and a fluid-outlet peripheral wall. The fluid-outlet channel is disposed at a center of the fluid-outlet plate. The fluid-outlet peripheral wall is configured to define a fluid-outlet space. The fluid-outlet space, the fluid-outlet channel and the at least one fluid-relief channel are in fluid communication. The valve aperture of the valve membrane, the fluid-outlet space and the fluid-outlet channel are in fluid communication. The fluid-outlet peripheral wall is engaged within the outer groove of the fluid-converging plate. The valve membrane is accommodated within the fluid-outlet space. The pump core module is accommodated within the fluid-converging space of the fluid-converging plate. After fluid is inhaled by the pump core module and flows into the pump core module, the fluid passes through the at least one fluid-converging aperture, flows into the fluid-converging chamber, pushes out the valve membrane to flow through the valve aperture, and enters the fluid-outlet channel of the fluid-outlet plate, so as to achieve fluid transportation.

The above contents of the present disclosure will become more readily apparent to those ordinarily skilled in the art after reviewing the following detailed description and accompanying drawings, in which:

BRIEF DESCRIPTION OF THE DRAWINGS

FIGS. 5A and 5B are a top view and a bottom view of the fluid-converging plate according to the first embodiment of the present disclosure, respectively;

FIG. 8A is a top view illustrating the micro pump according to the first embodiment of the present disclosure;

FIG. 8B is a schematic cross-sectional view taken from the line A-A in FIG. 8A;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
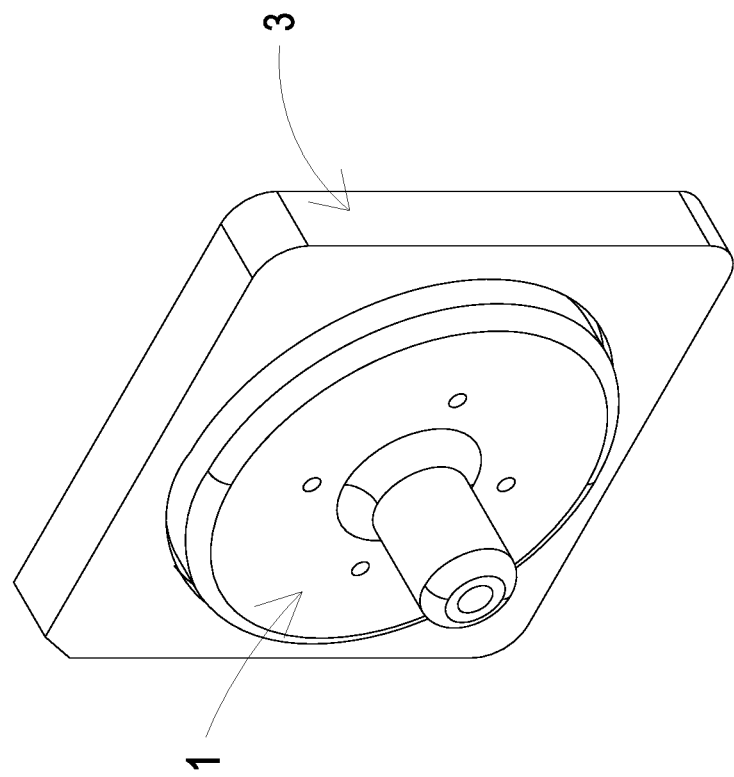
FIG. 1 is a schematic exterior view illustrating a micro pump according to a first embodiment of the present disclosure.
Figure 2A:
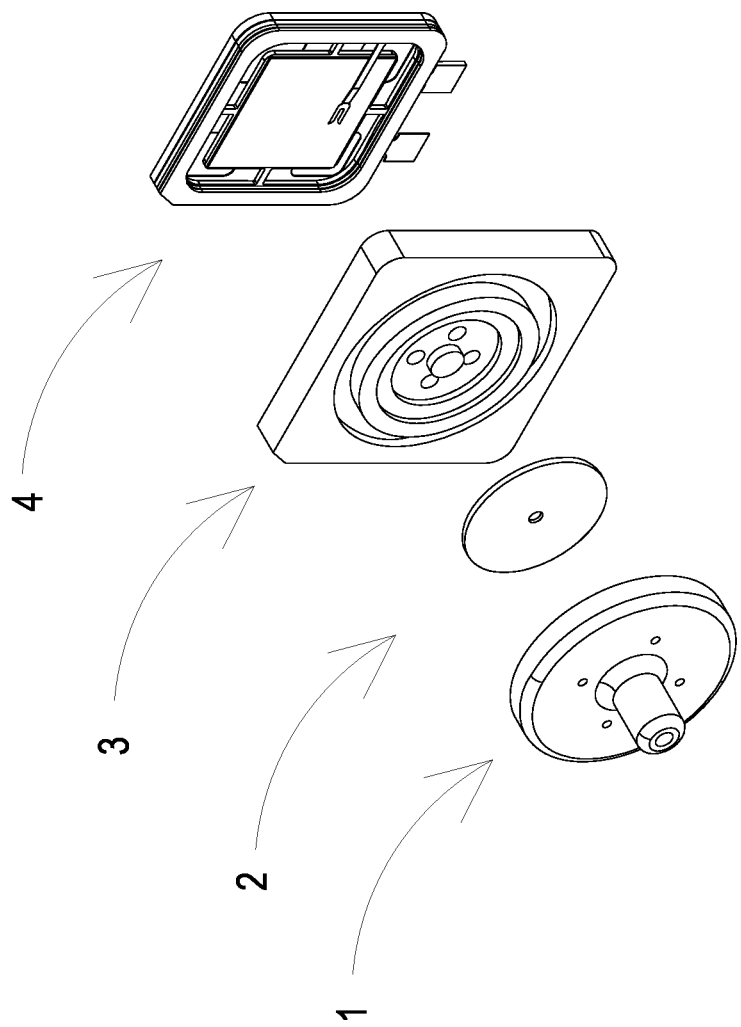
FIG. 2A is a schematic exploded view illustrating the micro pump according to the first embodiment of the present disclosure.
Figure 2B:
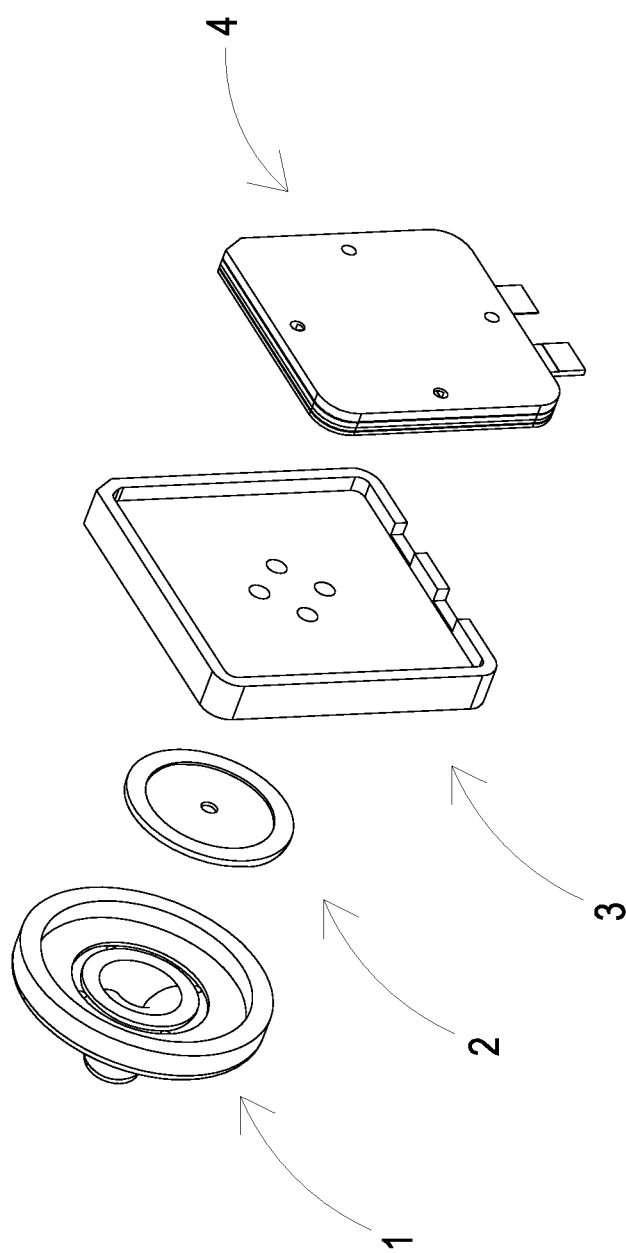
FIG. 2B is a schematic exploded view illustrating the micro pump according to the first embodiment of the present disclosure and taken along another viewpoint.

Please refer to FIG. 1 and FIGS. 2A to 2B. The present disclosure provides a micro pump 10 includes a fluid-outlet plate 1, a valve membrane 2, a fluid-converging plate 3 and a pump core module 4. The pump core module 4 is accommodated within the fluid-converging plate 3.

Figure 3B:
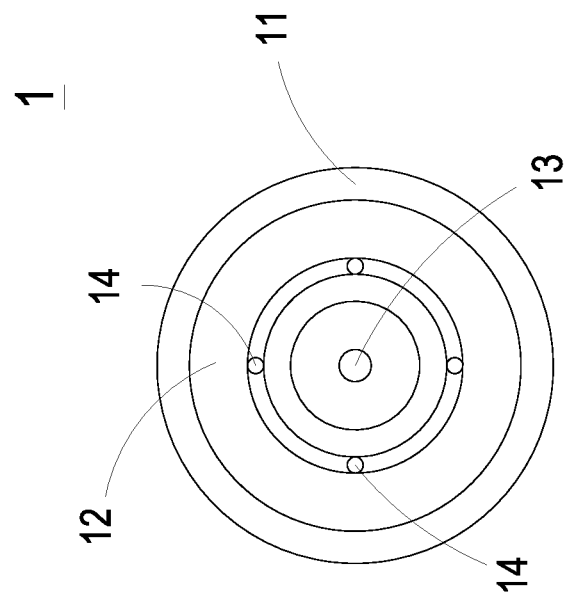
FIGS. 3A and 3B are a top view and a bottom view of the fluid-outlet plate according to the first embodiment of the present disclosure, respectively.
Figure 3A:
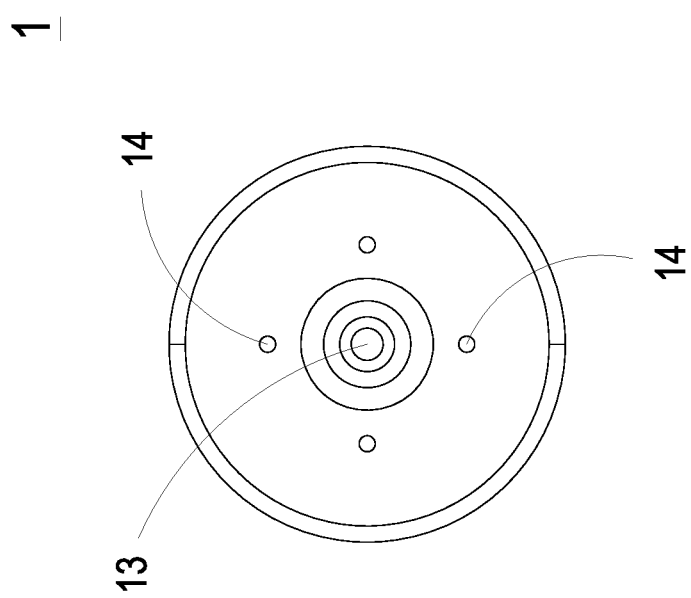
Figure 4A:
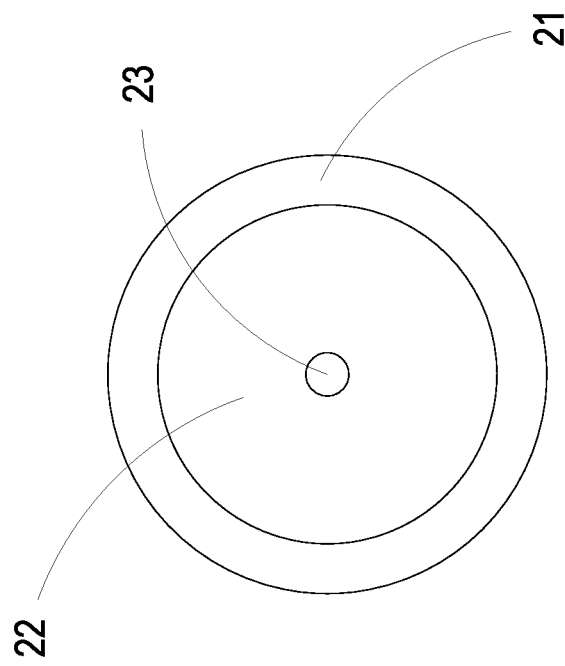
FIGS. 4A and 4B are a top view and a bottom view of the valve membrane according to the first embodiment of the present disclosure, respectively.
Figure 4B:
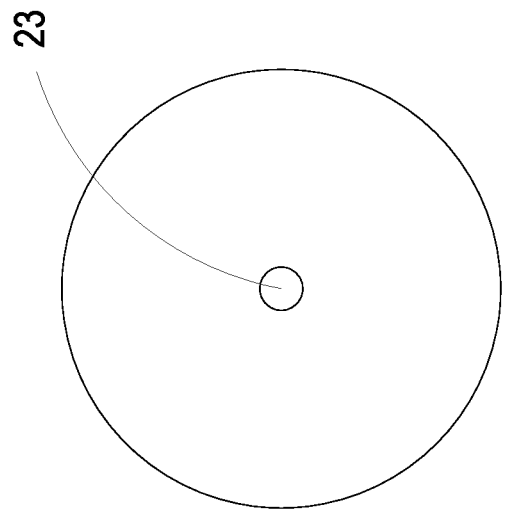
Figure 6A:
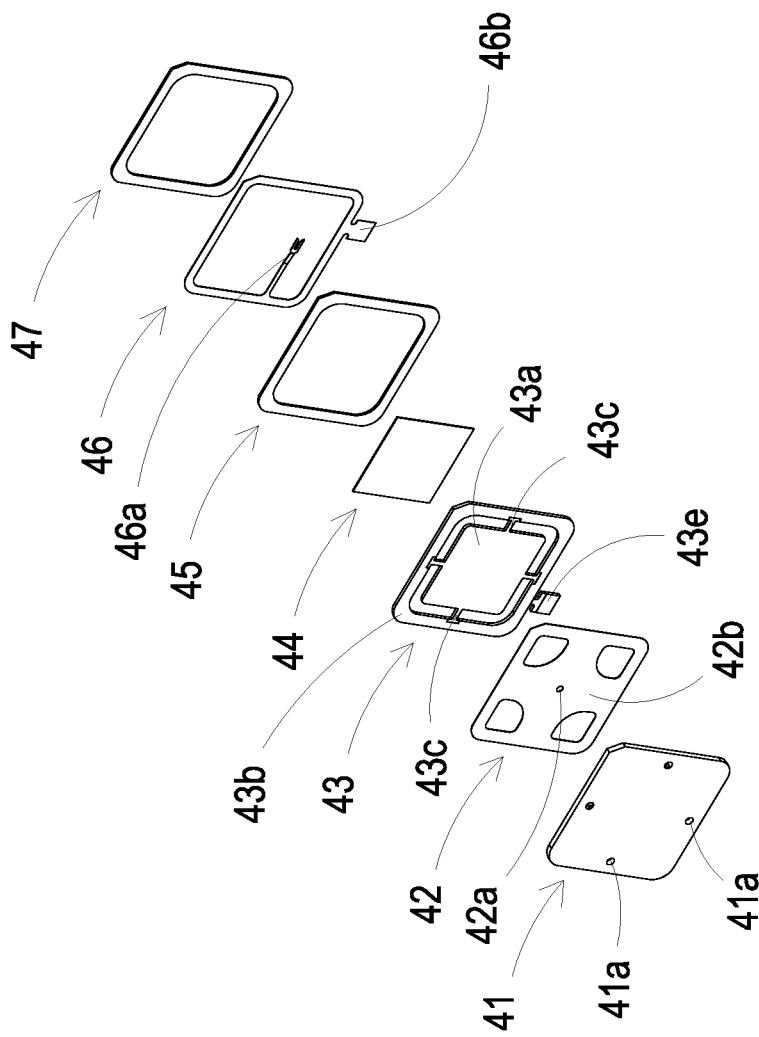
FIG. 6A is a schematic exploded view illustrating the pump core module according to the first embodiment of the present disclosure.
Figure 6B:
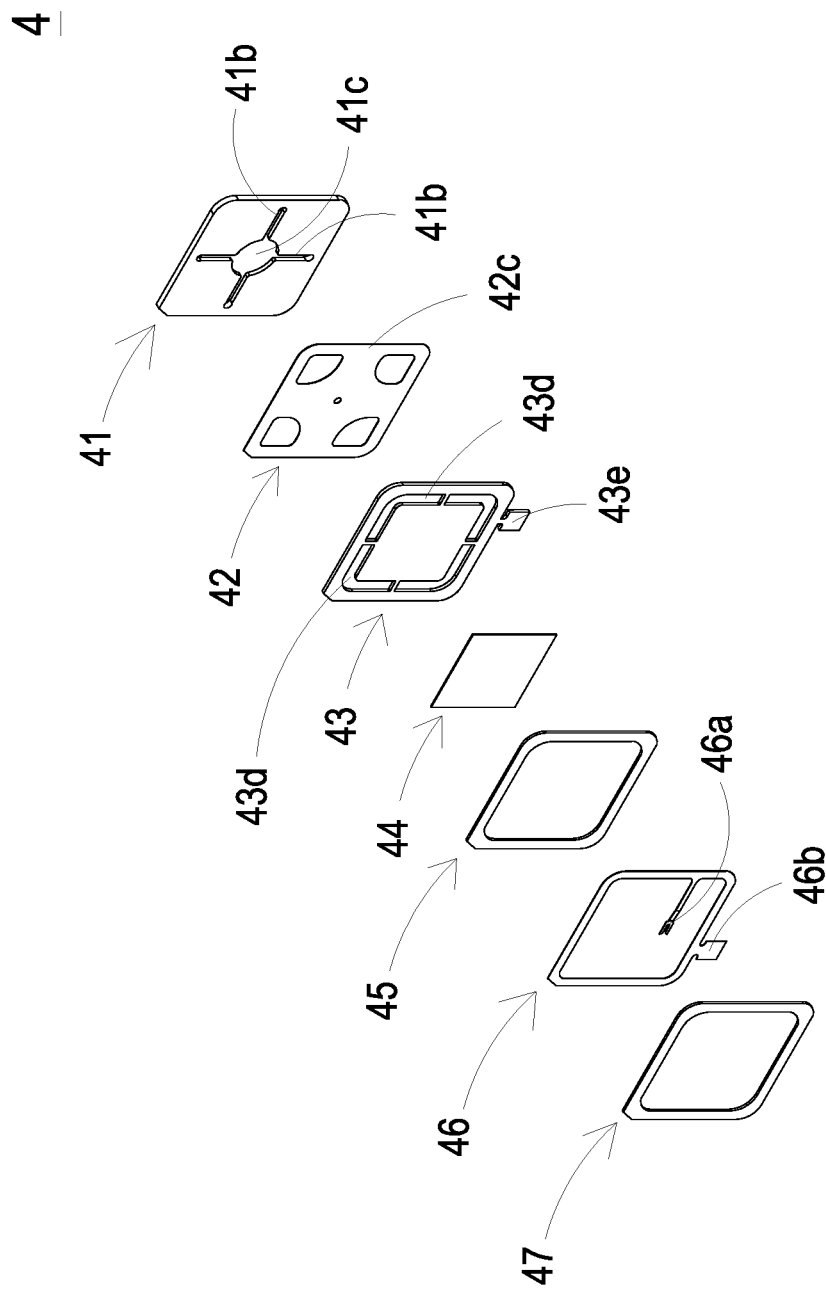
FIG. 6B is a schematic exploded view illustrating the pump core module according to the first embodiment of the present disclosure and taken along another viewpoint.

Please refer to FIGS. 3A and 3B. In the first embodiment, the fluid-outlet plate 1 includes a fluid-converging peripheral wall 11, a fluid-outlet space 12, a fluid-outlet channel 13 and at least one fluid-relief channel 14. The fluid-outlet peripheral wall 11 is extended from one side of the fluid-outlet plate 1, and defines the fluid-outlet space 12. The fluid-outlet 13 is disposed at a center of the fluid-outlet plate 1. More specifically, the fluid-outlet 13 is disposed at the center of the fluid-outlet plate 1 and extends from the fluid-outlet 13. The fluid-outlet peripheral wall 11 is a sidewall around the fluid-outlet plate 1 and extends from the fluid-outlet plate 1 in a direction opposite to the fluid-outlet 13, and the space embraced by the fluid-outlet peripheral wall 11 is the fluid-outlet space 12. The fluid-outlet space 12, the fluid-outlet channel 13 and the at least one fluid-relief channel 14 are in fluid communication.

Notably, in the first embodiment, the fluid-outlet plate 1 includes four fluid-relief channels 14, which are arranged equidistantly and surround the fluid-outlet channel 13, so that the fluid-outlet plate 1 forms a concentric symmetric structure. That is, the distance between two adjacent fluid-relief channels 14 are the same as the other two adjacent fluid-relief channels 14, and these four fluid-relief channels 14 are disposed concentric with the fluid-outlet channel 13. In the other embodiments, the number and the arrangement of the fluid-relief channels 14 and the shape of the fluid-outlet plate 1 are adjustable according to the practical requirements. The present disclosure is not limited thereto.

Notably, in the first embodiment, the fluid-outlet channel 13 is a straight channel. Thus, the fluid is transported in the direction perpendicular to the valve membrane 2. The present disclosure is not limited thereto.

Please refer to FIGS. 4A and 4B, and FIGS. 8A and 8B. In the first embodiment, the valve membrane 2 includes a valve peripheral wall 21, a valve space 22 and a valve aperture 23. The valve peripheral wall 21 is disposed on a side of the valve membrane 2 separated away from the fluid-outlet plate 1, and extended from the valve membrane 2 to stay away the fluid-outlet plate 1, thereby defining the valve space 22. More specifically, the valve membrane 2 has two opposite sides, one side faces the fluid-outlet plate 1 and the other one does not. The valve peripheral wall 21 extends from the side the valve membrane 2 doesn't face the fluid-outlet plate 2, and thus extends in the direction away from the fluid-outlet plate 1. The space embraced by this sidewall (i.e., valve peripheral wall 21) is the valve space 22. The valve aperture 23 is disposed at a center of the valve membrane 2. The valve aperture 23, and the fluid-outlet space 12 and the fluid-outlet channel 13 are in fluid communication. In the first embodiment, the valve membrane 2 is in a circular shape, so that the valve membrane 2 forms a concentric symmetric structure. In addition, the valve membrane 2 is a silicone sheet, but the present disclosure is not limited thereto. In other embodiments, the shape and material of the valve membrane 2 are adjustable according to the practical requirements. The present disclosure is not limited thereto.

Please refer to FIGS. 5A and 5B, and FIGS. 8A and 8B. In the first embodiment, the fluid-converging plate 3 has a first surface 3a and a second surface 3b. The first surface 3a and the second surface 3b are two opposite surfaces. In the embodiment, the fluid-converging plate 3 includes an outer groove 31, an inner recess 32, a protruding portion 33, at least one fluid-converging aperture 34, a fluid-converging peripheral wall 35, a fluid-converging space 36 and two openings 37. The outer groove 31 is disposed on the first surface 3a and in a ring shape. The inner recess 32 is disposed in the first surface 3a and surrounded by the outer groove 31. The protruding portion 33 is disposed on the first surface 3a and located at a center of the inner recess 32. In the embodiment, the inner recess 32 and the protruding portion 33 are in a circular shape, respectively, so that the fluid-converging plate 3 forms a concentric symmetric structure. In the embodiment, the at least one fluid-converging aperture 34 penetrates the first surface 3a and the second surface 3b of the fluid-converging plate 3, and disposed in the inner recess 32 and adjacent to an outer edge of the protruding portion 33. The fluid-converging peripheral wall 35 is disposed on the second surface 3b and extends in the direction away from the valve membrane 2, thereby defining the fluid-converging space 36. The valve membrane 2 is disposed in the inner recess 32 of the fluid-converging plate 3, and therefore the protruding portion 33 abuts against the valve aperture 23 of the valve membrane 2, and a fluid-converging chamber C is formed between the valve membrane 2 and the fluid-converging plate 3, as shown in FIG. 8B. The valve membrane 2 seals the fluid-relief channels 14, and the protruding portion 33 seals the valve aperture 23 of the valve membrane 2. It should be noted that the inner recess 32 substantially contains two concentric recesses (hereinafter referred to as a first inner recess and a second inner recess), as shown in FIG. 8B. The first inner recess closely surrounds the protruding portion 33 and is substantially the space to be formed as the fluid-converging chamber C. The second inner recess closely surrounds the first inner recess and has a larger perimeter than the first inner recess, and thus is substantially the platform to be in contact with the valve peripheral wall 21.

Notably, in the first embodiment, the fluid-converging plate 3 includes four fluid-converging apertures 34, which are arranged equidistantly and surrounding the protruding portion 33. That is, the distance between two adjacent fluid-converging apertures 34 is the same as the distance between the other two adjacent fluid-converging apertures 34. In other embodiments, the number and arrangement of the fluid-converging apertures 34 are adjustable according to the practical requirements. The present disclosure is not limited thereto.

Notably, in the first embodiment, the fluid-outlet peripheral wall 11 of the fluid-outlet plate 1 is engaged within the outer groove 31 of the fluid-converging plate. In this way, the valve membrane 2 is accommodated within the fluid-outlet space 12 of the fluid-outlet plate 1. In the embodiment, the fluid-outlet plate 1 and the fluid-converging plate 3 are adhered directly, so that the valve membrane 2 is clamped between the fluid-outlet plate 1 and the fluid-converging plate 3 firmly. In other embodiments, the connection between the fluid-outlet plate 1 and the fluid-converging plate 3 is adjustable according to the practical requirements. The present disclosure is not limited thereto.

Notably, in the first embodiment, the micro pump 10 has a total thickness (excluding the part of the fluid-outlet channel 13) ranging from 1 millimeter (mm) to 6 millimeter (mm) The present disclosure is not limited thereto. In other embodiments, the value of the total thickness is adjustable according to the practical requirements.

Please refer to FIGS. 2A and 3B, FIG. 5B, and FIGS. 6A to 7A. In the embodiment, the pump core module 4 is accommodated within the fluid-converging space 36 of the fluid-converging plate 3. In the embodiment, the pump core module 4 includes a fluid-inlet plate 41, a resonance plate 42, a piezoelectric actuator 43, a first insulation plate 45, a conducting plate 46 and a second insulation plate 47, which are stacked sequentially. The fluid-inlet plate 41 includes at least one inlet aperture 41a, at least one convergence channel 41b and a convergence chamber 41c. The at least one inlet aperture 41a allows the fluid to flow in and passes through the at least one convergence channel 41b. The at least one convergence channel 41b and the convergence chamber 41c are in fluid communication. Thus, the liquid inhaled through the at least inlet aperture 41a is transported through the at least one convergence channel 41b and converged into the convergence chamber 41c. In the first embodiment, the number of the inlet apertures 41a and the number of the convergence channels 41b are equal to four, respectively. The present disclosure is not limited thereto. The numbers of the inlet apertures 41a and the convergence channels 41b are adjustable according to the practical requirements. In the embodiment, the four inlet apertures 41a pass through the four convergence channels 41b, respectively, and the four convergence channels 41b are in fluid communication with the convergence chamber 41c.

In the first embodiment, the resonance plate 42 is connected and attached to the fluid-inlet plate 41, and includes a central aperture 42a, a movable portion 42b and a fixing part 42c. The central aperture 42a is disposed at a center of the resonance plate 42 and aligned with the convergence chamber 41c of the fluid-inlet plate 41. The movable part 42b surrounds the central aperture 42a. The fixing part 42c is located at a peripheral portion of the resonance plate 42 and is fixed on and attached to the fluid-inlet plate 41.

In the first embodiment, the piezoelectric actuator 43 is connected and attached to the resonance plate 42, and includes a suspension plate 43a, an outer frame 43b, at least one bracket 43c, a piezoelectric element 44, at least one vacant space 43d and a first conductive pin 43e. The suspension plate 43a is a square suspension plate, and permitted to undergo a bending vibration. That is, the suspension plate 43a is capable of being bent and may be permitted to undergo vibration. In the embodiment, the suspension plate 43a adopts a square shape. Compared to the design of the circular shape, the structure of the suspension plate 43a in the square shape has an obvious advantage of power saving. The power consumption of a capacitive load operated at a resonance frequency is increased as the frequency is raised, and the frequency of the suspension plate 43a in the square shape is significantly lower than that of the suspension plate in the circular shape. Therefore, the power consumption of the suspension plate 43a in the square shape is significantly lower than that of the suspension plate in the circuit shape. Namely, the suspension plate 43a of the present disclosure may be designed in a square shape and has the advantage of power saving. In the embodiment, the outer frame 43b is arranged around the suspension plate 43a. The at least one bracket 43c is connected between the suspension plate 43a and the outer frame 43b for elastically supporting the suspension plate 43a. In the embodiment, a length of a side of the piezoelectric element 44 is smaller than or equal to a length of a side of the suspension plate 43a, and the piezoelectric element 44 is attached on a surface of the suspension plate 43a to drive the suspension plate 43a to undergo the bending vibration in response to an applied voltage. The at least one vacant space 43d is formed among the suspension plate 43a, the outer frame 43b and the bracket 43c for allowing the fluid to flow through. The first conductive pin 43e is extended outwardly from an outer edge of the outer frame 43b.

In the first embodiment, the conducting plate 46 includes an electrode 46a protruded from an inner edge thereof, and a second conducting pin 46b protruded from an outer edge thereof. The electrode 46a is electrically connected to the piezoelectric element 44 of the piezoelectric actuator 43. The first conducting pin 43e of the piezoelectric actuator 43 and the second conducting pin 46b of the conducting plate 46 are externally connected to an external current, thereby driving the piezoelectric element 44 of the piezoelectric actuator 43. The first conducting pin 43e and the second conducting pin 46b are extended outside the fluid-converging plate 3 through the plurality of openings 37, respectively. In addition, with the arrangement of the first insulation plate 45 and the second insulation plate 47, the occurrence of short circuit is avoided.

Figure 7A:
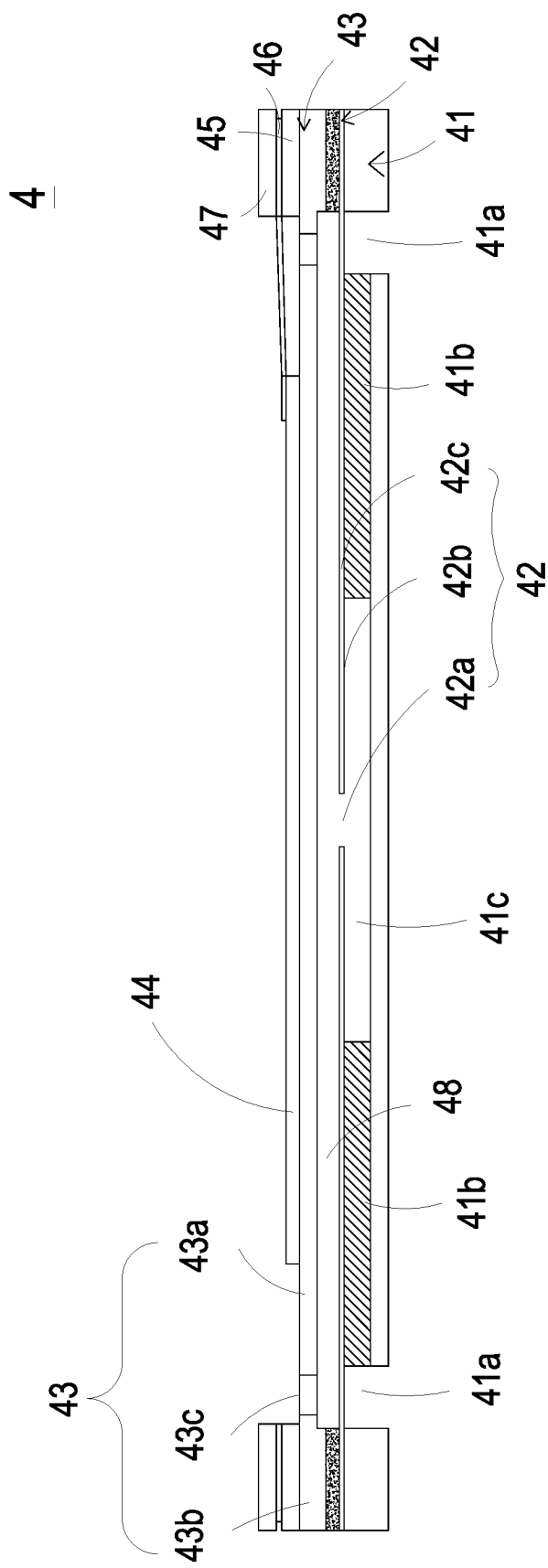
FIG. 7A is a schematic cross-sectional view illustrating an exemplary structure of the pump core module.
Figure 7B:
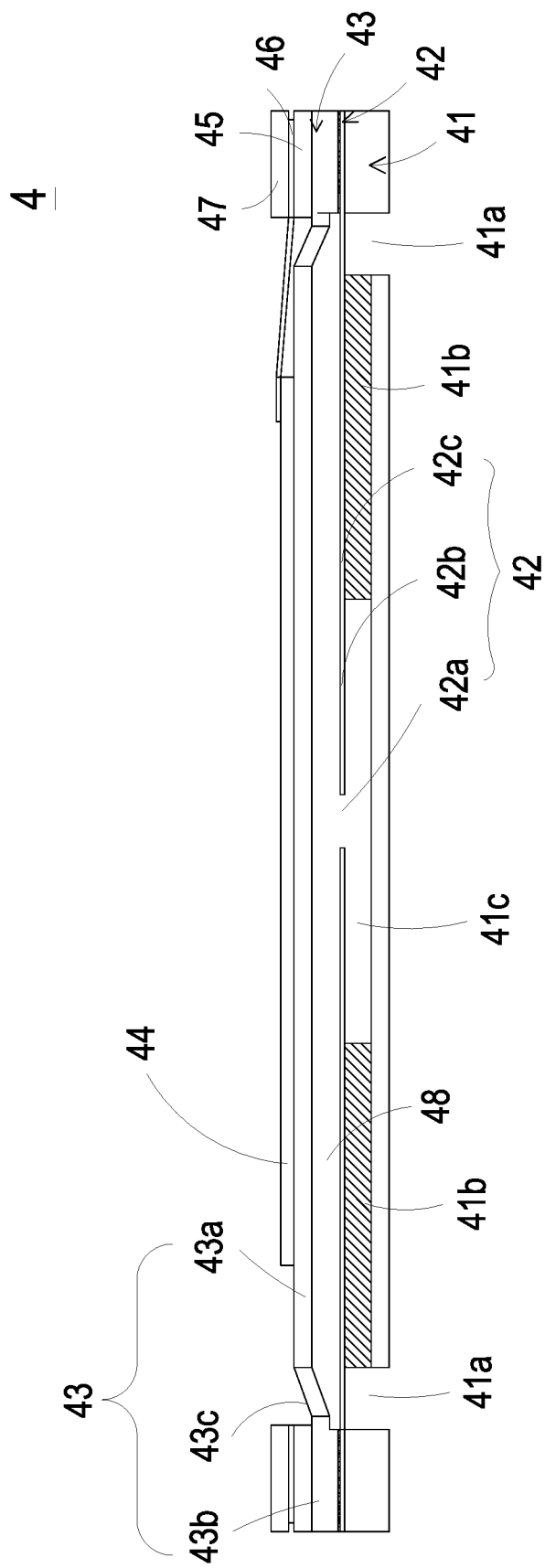
FIG. 7B is a schematic cross-sectional view illustrating another exemplary structure of the pump core module.

Please refer to FIG. 7A. In the first embodiment, a resonance chamber 48 is formed between the suspension plate 43a and the resonance plate 42. The resonance chamber 48 is formed by filling a material, for example but not limited to a conductive adhesive, into a gap between the resonance plate 42 and the outer frame 43b of the piezoelectric actuator 43. Thus, a depth from the resonance plate 42 to the suspension plate 43a of the piezoelectric actuator 43 can be maintained, and the fluid can be transported rapidly. In addition, since the proper distance between the suspension plate 43a and the resonance plate 42 is maintained, the contact interference is reduced and the generated noise is largely reduced. In some embodiments, alternatively, the height of the outer frame 43b of the piezoelectric actuator 43 is increased, so that the thickness of the conductive adhesive filled within the gap between the resonance plate 42 and the outer frame 43b of the piezoelectric actuator 43 may be reduced. Thus, in the case where the suspension plate 43a and the resonance plate 42 are maintained at a proper distance, the thickness of the conductive adhesive filled within the overall assembly of the pump core module 4 won't be affected by a hot pressing temperature and a cooling temperature, and it benefits to avoid that the conductive adhesive affects the actual size of the resonance chamber 48 due to the factors of thermal expansion and contraction after the assembly is completed. The present disclosure is not limited thereto. In addition, the transportation efficiency of the pump core module 4 is affected by the resonance chamber 48, so that the resonance chamber 48 maintained in a fixed size is important to provide stable transportation efficiency for the pump core module 4. Please refer to FIG. 7B. In another exemplary structure of the pump core module 4, the suspension plate 43*a* can be formed by a stamping method. The stamping method makes the suspension plate 43*a* extended upwardly at a distance, and the distance extended upwardly may be adjusted by the bracket 43*c* formed between the suspension plate 43*a* and the outer frame 43*b*, so that a surface of the suspension plate 43*a* and a surface of the outer frame 43*b* are two non-coplanar surfaces. A small amount of a filling material, for example a conductive adhesive, is applied to the assembly surface of the outer frame 43*b* to attach the piezoelectric actuator 43 on the fixing part 42*c* of the resonance plate 42 by means of hot pressing, so that the piezoelectric actuator 43 is assembled with the resonance plate 42. In this way, the entire structure may be improved by adopting the stamping method to form the suspension plate 43*a* of the piezoelectric actuator 43, thereby modifying the resonance chamber 48. A desired size of the resonance chamber 48 may be satisfied by simply adjusting the distance as described made by the stamping method. It simplifies the structural design for adjusting the resonance chamber 48. At the same time, it achieves the advantages of simplifying the process and saving the process time. In the embodiment, the first insulation plate 45, the conducting plate 46 and the second insulation plate 47 are all frame-shaped thin sheet, and stacked sequentially on the piezoelectric actuator 43 to obtain the entire structure of the pump core module 4.

Figure 7C:
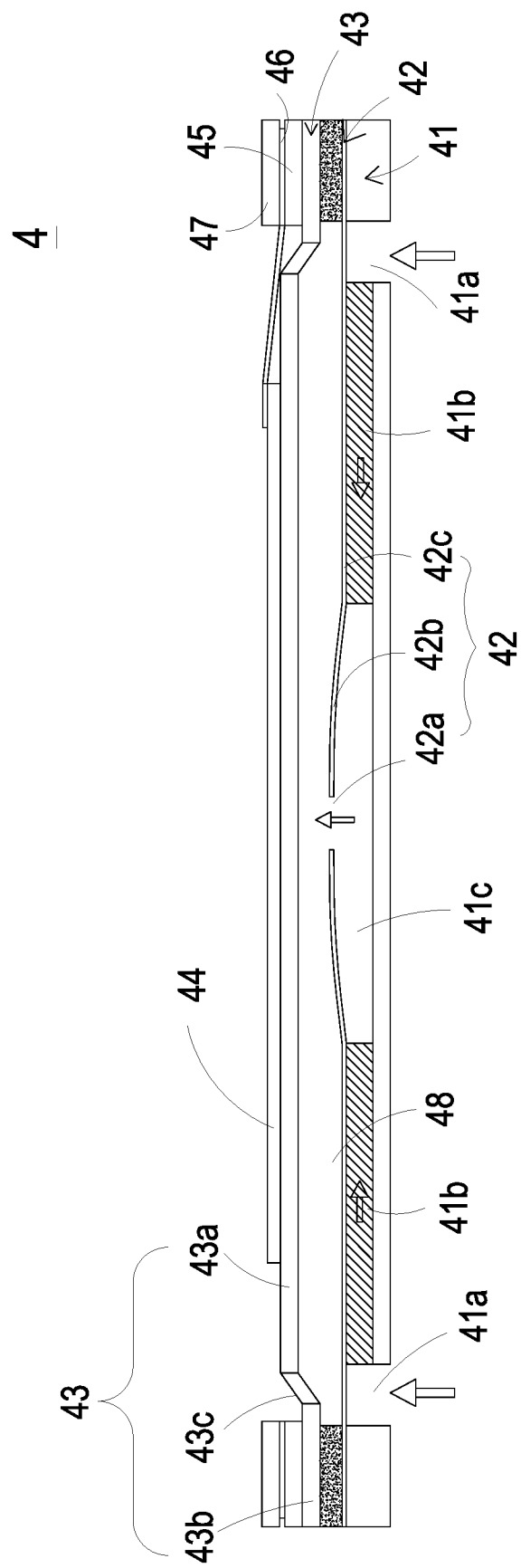
FIGS. 7C to 7E are cross sectional views illustrating actions of the pump core module of the present disclosure.
Figure 7D:
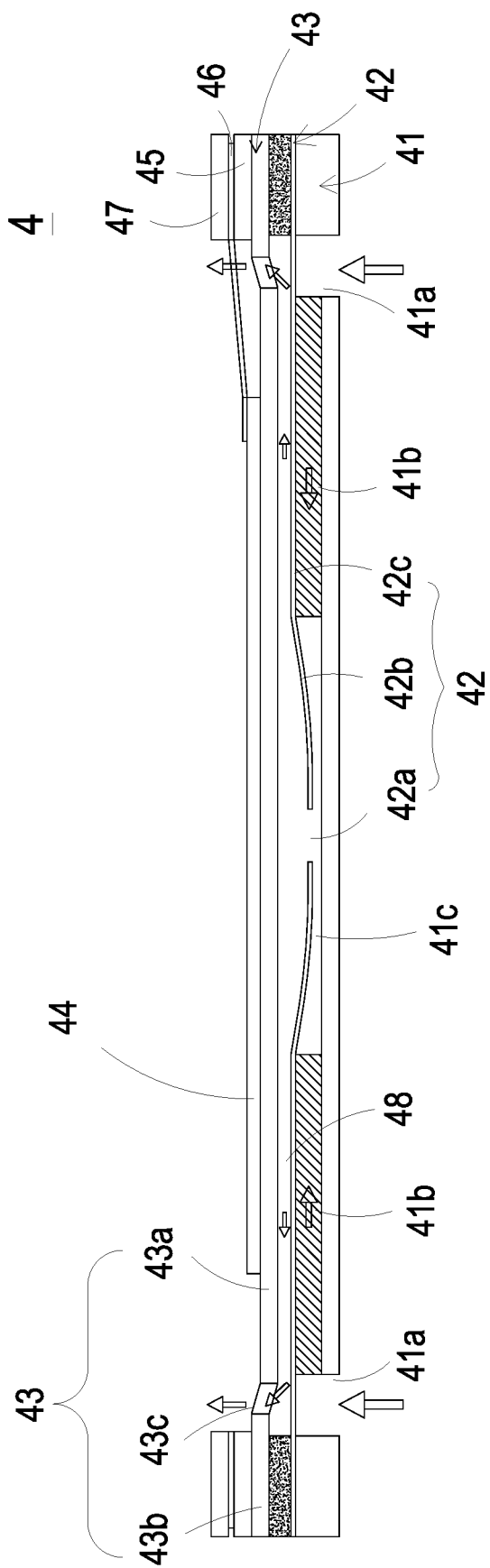
Figure 7E:
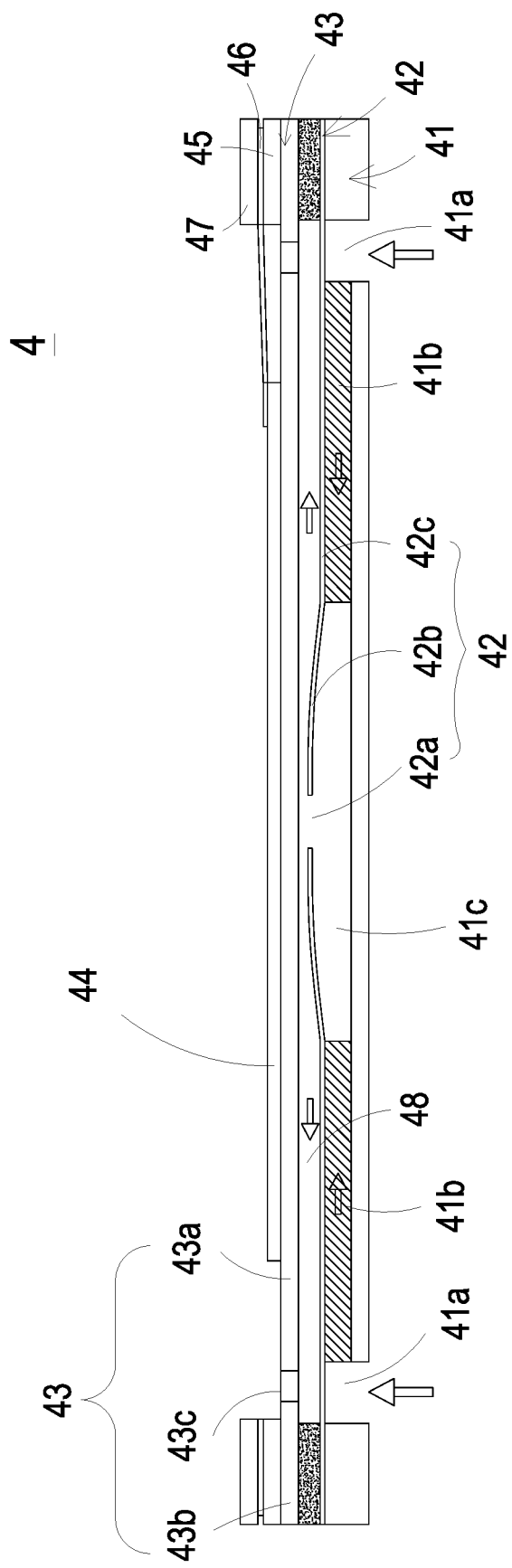

For describing the actions of the pump core module 4, please refer to FIGS. 7C to 7E. Firstly, as shown in FIG. 7C, when the piezoelectric element 44 of the piezoelectric actuator 43 is deformed in response to an applied voltage, the suspension plate 43*a* is displaced in a direction away from the fluid-inlet plate 41. In that, the volume of the resonance chamber 48 is increased, a negative pressure is formed in the resonance chamber 48, and the fluid in the convergence chamber 41*c* is inhaled, passes through the central aperture 42*a* of the resonance plate 42 and enters the resonance chamber 48. At the same time, the resonance plate 42 is in resonance and thus displaced synchronously in the direction away from the fluid-inlet plate 41. Thereby, the volume of the convergence chamber 41*c* is increased. Since the fluid in the convergence chamber 41*c* flows into the resonance chamber 48, the convergence chamber 41*c* is also in a negative pressure state, and the fluid is inhaled into the convergence chamber 41*c* by flowing through the inlet apertures 41*a* and the convergence channels 41*b*. Then, as shown in FIG. 7D, the piezoelectric element 44 drives the suspension plate 43*a* to be displaced toward the fluid-inlet plate 41 to compress the resonance chamber 48. Similarly, the resonance plate 42 is in resonance with the suspension plate 43*a* and is displaced toward the fluid-inlet plate 41. Thus, the fluid in the resonance chamber 48 is compressed synchronously and forced to be further transported through the vacant space 43*d* and discharged out of the pump core module 4, to achieve the effect of fluid transportation. Finally, as shown in FIG. 7E, when the suspension plate 43*a* vibrates in the direction away from the fluid-inlet plate 41 and back to the initial position, the resonance plate 42 is also driven to displace in the direction away from the fluid-inlet plate 41 at the same time. In that, the resonance plate 42 pushes the fluid in the resonance chamber 48 toward the vacant space 43*d*, and the volume of the convergence chamber 41*c* is increased. Thus, the fluid can continuously flow through the inlet apertures 41*a* and the convergence channels 41*b* and be converged in the confluence chamber 41*c*. By repeating the actions of the pump core module 4 shown in the above-mentioned FIGS. 7C to 7E continuously, the pump core module 4 can continuously transport the fluid. The fluid is inhaled through the inlet aperture 41*a* and enters the flow channel formed by the fluid-inlet plate 41 and the resonance plate 42. A pressure gradient is generated in the flow channel, and then the fluid is discharged through the vacant space 43*d*. Thus, the fluid is transported at a high speed to accomplish the fluid transportation and output operations of the pump core module 4.

Figure 8C:
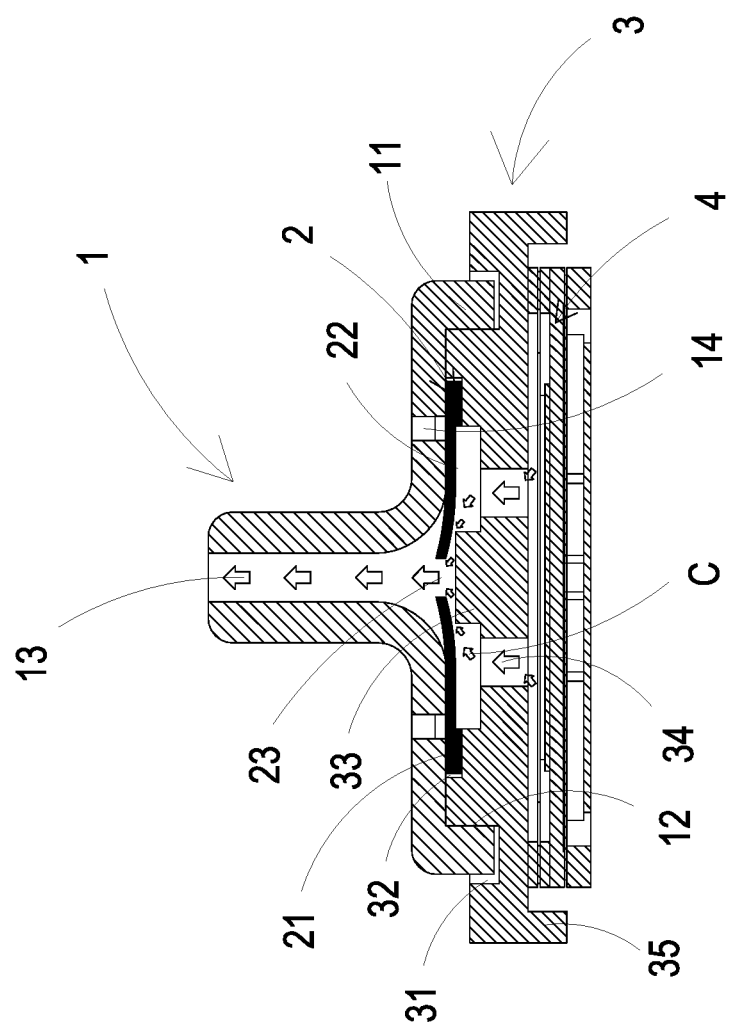
FIG. 8C is a cross sectional view schematically illustrating the action of fluid transportation by the micro pump according to the first embodiment of the present disclosure.
Figure 8D:
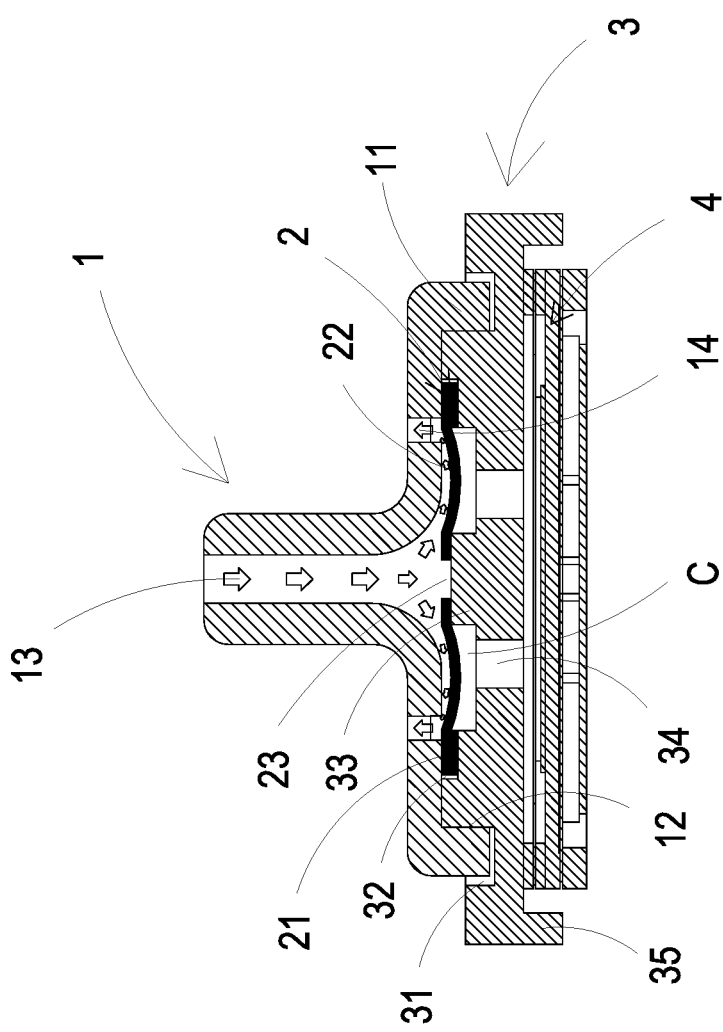
FIG. 8D is a cross sectional view schematically illustrating the action of discharging fluid by the micro pump according to the first embodiment of the present disclosure.
Figure 9:
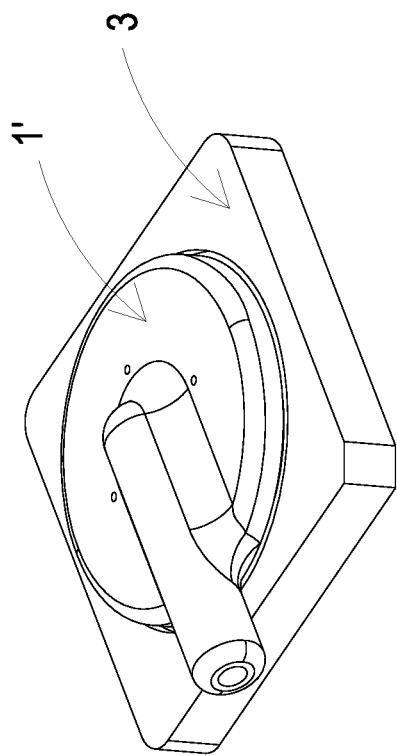
FIG. 9 is a schematic exterior view illustrating a micro pump according to a second embodiment of the present disclosure.
Figure 10B:
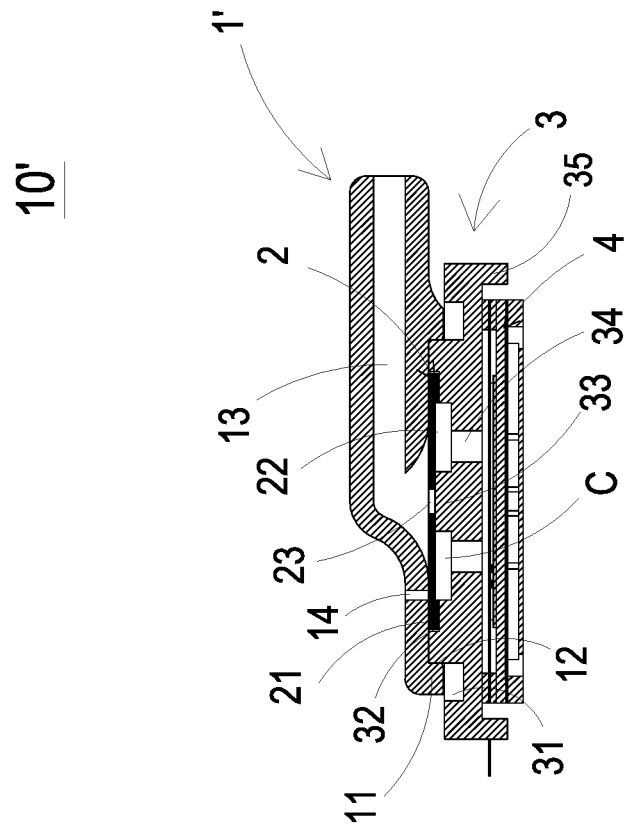
FIG. 10B is a schematic cross-sectional view taken from the line B-B in FIG. 10A.
Figure 10A:
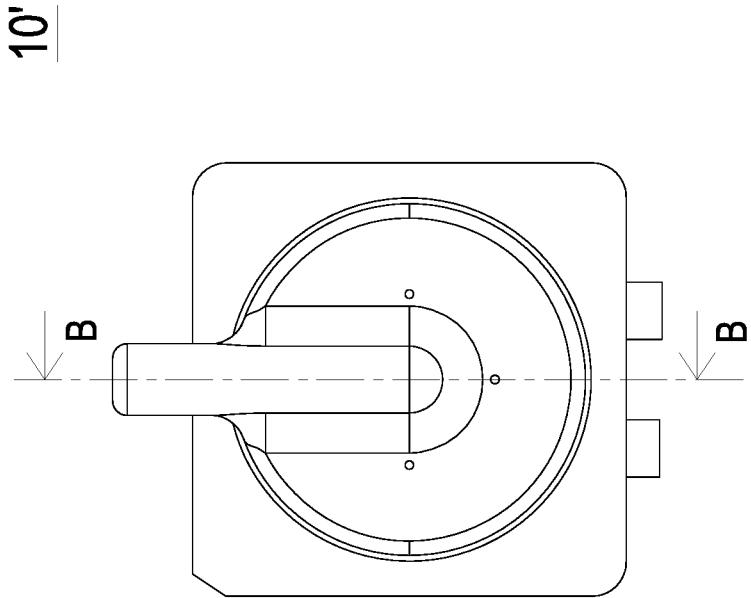
FIG. 10A is a top view illustrating the micro pump according to the second embodiment of the present disclosure.
Figure 10C:
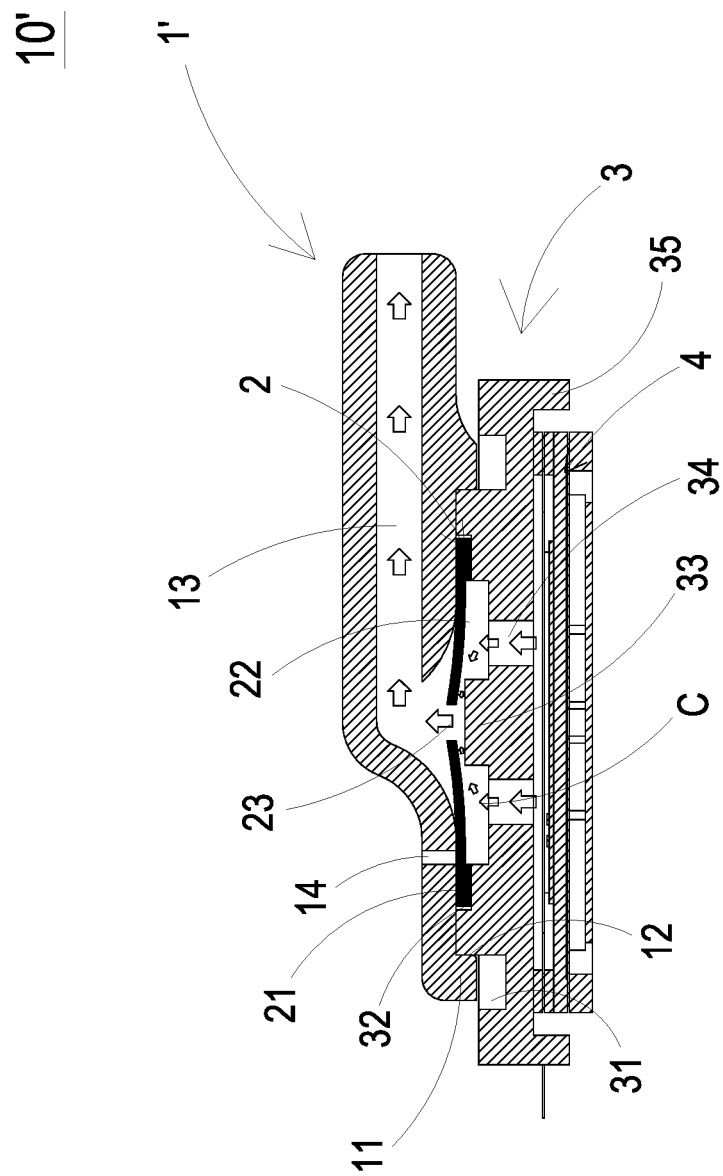
FIG. 10C is a cross sectional view schematically illustrating the action of fluid transportation by the micro pump according to the second embodiment of the present disclosure.
Figure 10D:
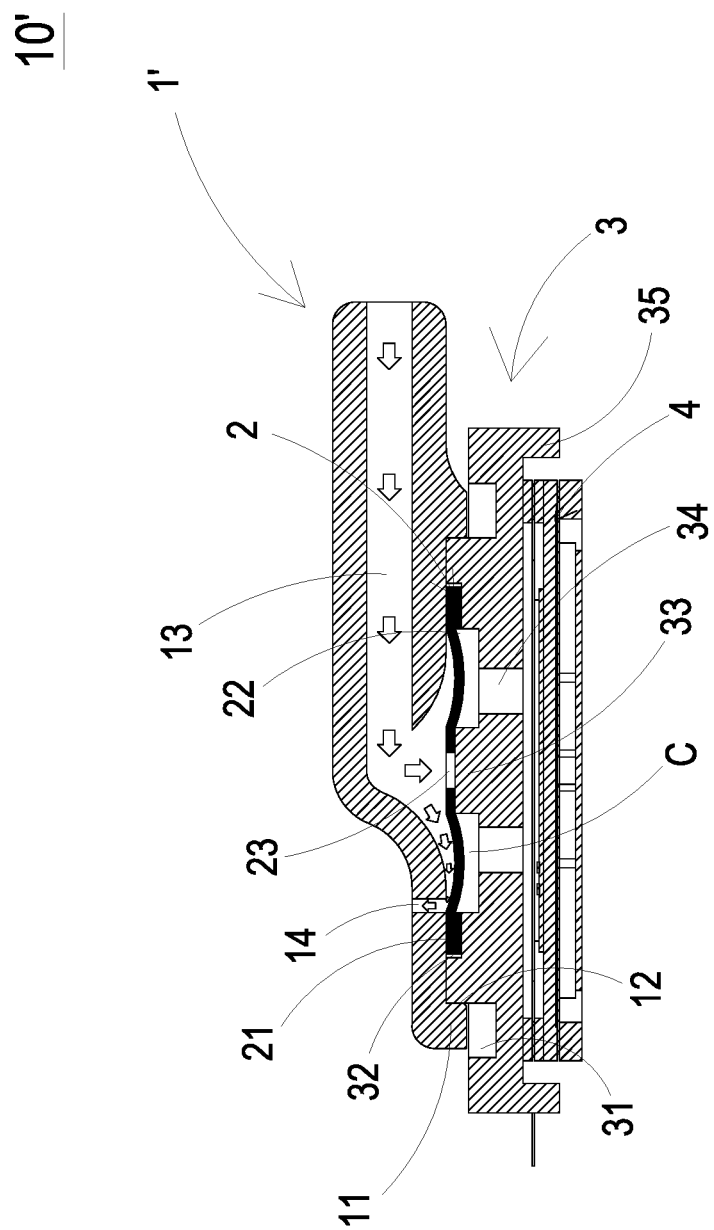
FIG. 10D is a cross sectional view schematically illustrating the action of discharging fluid by the micro pump according to the second embodiment of the present disclosure.

Please refer to FIGS. 8A to 8D. In the embodiment, when the micro pump 10 is actuated and the pump core module 4 is driven, the fluid outside the micro pump 10 is inhaled into the pump core module 4. The fluid passes through the fluid-converging aperture 34 of the fluid-converging plate 3 and flows into the fluid-converging chamber C. Then, the fluid pushes out the valve membrane 2, by which the valve aperture 23 of the valve membrane 2 separates from the protruding portion 33 of the fluid-converging plate 3. Finally, the fluid flows through the valve aperture and enters the fluid-outlet channel 13 of the fluid-outlet plate 1, so as to achieve fluid transportation, as shown in FIG. 8C. When the micro pump 10 is unactuated and the pump core module 4 is not driven, the fluid may flow back from the fluid-outlet channel 13 into the micro pump 10 and the portion of the valve membrane 2 corresponding to the fluid-converging chamber C is pushed away from the fluid-outlet plate 1. In that, the fluid flows through the space between the valve membrane 2 and the fluid-outlet plate 1, and enters the fluid-relief channel 14, as shown in FIG. 8D. Consequently, the fluid is discharged out of the micro pump 10, so as to achieve fluid discharging.

Please refer to FIG. 9 and FIGS. 10A to 10D. In a second embodiment, the structures, elements and functions of the micro pump 10' are similar to those of the micro pump 10 in FIG. 1, FIGS. 2A to 2B and FIGS. 8A to 8D. The elements and features indicated by the numerals similar to those of the first embodiment mean similar elements and features, and are not redundantly described herein. In the second embodiment, the structure of the fluid-outlet plate 1' is different from the structure of the fluid-outlet plate 1 in the first embodiment, and the difference is the type of the fluid-outlet channel 13. In the second embodiment of the present disclosure, the fluid-outlet channel 13 is a curved channel. Thus, the fluid can be transported laterally from the micro pump 10'. Notably, since the fluid-outlet plate 1' forms a concentric symmetric structure, the design of the output direction of the fluid is adjustable with 360° flexibility, which means that the outlet direction of the fluid-outlet channel 13 can be rotated by 360° around the protruding portion 33 of the fluid-converging plate 3 as the center. Thus, the user can easily adjust the outlet direction of the fluid-outlet channel 13 according to the desired output direction when using it.

In summary, the present disclosure provides a micro pump. The micro pump forms a concentric symmetric structure with backstop and unidirectional output, and realizes a pressure relief function. It is beneficial to reduce the structure of the valve membrane greatly, enhance the overall reliability of airtightness, increase the flexibility of the design regarding the output direction, and reduce the flow resistance of pressure relief greatly. It is extremely valuable for the use of the industry, and it is submitted in accordance with the law.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A micro pump comprising:
    a fluid-converging plate having a first surface and a second surface, wherein the first surface and the second surface are two opposite surfaces, and the fluid-converging plate comprises:
        an outer groove disposed on the first surface;
        an inner recess disposed on the first surface and surrounded by the outer groove; a protruding portion disposed on the first surface and located at a center of the inner recess;
        at least one fluid-converging aperture disposed in the inner recess and adjacent to an outer edge of the protruding portion, wherein the fluid-converging aperture penetrates the first surface and the second surface of the fluid-converging plate; and
        a fluid-converging peripheral wall disposed on the second surface of the fluid-converging plate to define a fluid-converging space;
    a valve membrane disposed in the inner recess of the fluid-converging plate and comprising a valve aperture disposed at a center of the valve membrane, wherein the protruding portion of the fluid-converging plate abuts against the valve aperture, and a fluid-converging chamber is formed between the valve membrane and the fluid-converging plate;
    a fluid-outlet plate comprising a fluid-outlet channel, at least one fluid-relief channel and a fluid-outlet peripheral wall, wherein the fluid-outlet channel is disposed at a center of the fluid-outlet plate, and the fluid-outlet peripheral wall is configured to define a fluid-outlet space, wherein the fluid-outlet space, the fluid-outlet channel and the at least one fluid-relief channel are in fluid communication, wherein the valve aperture of the valve membrane, the fluid-outlet space and the fluid-outlet channel are in fluid communication, wherein the fluid-outlet peripheral wall is engaged within the outer groove of the fluid-converging plate, whereby the valve membrane is accommodated within the fluid-outlet space; and
    a pump core module accommodated within the fluid-converging space of the fluid-converging plate,
    wherein after fluid is inhaled by the pump core module and flows into the pump core module, the fluid passes through the at least one fluid-converging aperture, flows into the fluid-converging chamber, pushes out the valve membrane to flow through the valve aperture, and enters the fluid-outlet channel of the fluid-outlet plate, so as to achieve fluid transportation.

2. The micro pump according to claim 1, wherein the fluid-converging plate comprises a plurality of fluid-converging apertures arranged in the inner recess equidistantly and surrounding the protruding portion.

3. The micro pump according to claim 2, wherein the outer groove of the fluid-converging plate is in a ring shape, and the inner recess and the protruding portion of the fluid-converging plate are in a circular shape, respectively, so that the fluid-converging plate forms a concentric symmetric structure.

4. The micro pump according to claim 1, wherein the fluid-outlet plate comprises a plurality of fluid-relief channels arranged equidistantly and surrounding the fluid-outlet channel.

5. The micro pump according to claim 4, wherein the fluid-outlet plate is in a circular shape, so that the fluid-outlet plate forms a concentric symmetric structure.

6. The micro pump according to claim 1, wherein the valve membrane comprises a valve peripheral wall disposed on a side of the valve membrane adjacent to the fluid-converging plate, and accommodated within the inner recess of the fluid-converging plate.

7. The micro pump according to claim 1, wherein the fluid-outlet channel is a straight channel.

8. The micro pump according to claim 1, wherein the fluid-outlet channel is a curved channel.

9. The micro pump according to claim 1, wherein the pump core module comprises:
    a fluid-inlet plate comprising at least one inlet aperture, at least one convergence channel and a convergence chamber, wherein the at least one inlet aperture allows the fluid to flow in and passes through the convergence channel, and the convergence channel and the convergence chamber are in fluid communication, so that the liquid inhaled through the at least inlet aperture is transported through the at least one convergence channel and converged into the convergence chamber;
    a resonance plate connected and attached to the fluid-inlet plate and having a central aperture, a movable part and a fixing part, wherein the central aperture is disposed at a center of the resonance plate and aligned with the convergence chamber of the fluid-inlet plate, the movable part surrounds the central aperture, and the fixing part is located at a peripheral portion of the resonance plate and is fixed on and attached to the fluid-inlet plate; and
    a piezoelectric actuator connected and attached to the resonance plate,
    wherein a resonance chamber is formed between the resonance plate and the piezoelectric actuator, whereby when the piezoelectric actuator is driven, the movable part of the resonance plate is in resonance with the piezoelectric actuator, and the fluid is introduced into the at least one inlet aperture of the fluid-inlet plate, converged to the convergence chamber along the at least one convergence channel, and flows into the central aperture of the resonance plate, so as to achieve fluid transportation.

10. The micro pump according to claim 9, wherein the piezoelectric actuator comprises:
    a suspension plate being a square suspension plate and permitted to undergo a bending vibration;
    an outer frame arranged around the suspension plate;
    at least one bracket connected between the suspension plate and the outer frame for elastically supporting the suspension plate; and
    a piezoelectric element, wherein a length of a side of the piezoelectric element is smaller than or equal to a length of a side of the suspension plate, and the piezoelectric element is attached on a surface of the suspension plate to drive the suspension plate to undergo the bending vibration in response to an applied voltage.

11. The micro pump according to claim 10, wherein the pump core module further comprises a first insulation plate, a conducting plate and a second insulation plate, wherein the fluid-inlet plate, the resonance plate, the piezoelectric actuator, the first insulation plate, the conducting plate and the second insulation plate are stacked sequentially.

12. The micro pump according to claim 11, wherein the piezoelectric actuator further comprises a first conducting pin extended outwardly from an outer edge of the outer frame, the conducting plate has a second conducting pin extended outwardly from an outer edge of the conducting plate, and the fluid-converging plate comprises a plurality of openings, wherein the first conducting pin and the second conducting pin are extended outside the fluid-converging plate through the plurality of openings, respectively.

13. The micro pump according to claim 9, wherein the piezoelectric actuator comprises:

a suspension plate being a square suspension plate and permitted to undergo a bending vibration;

an outer frame arranged around the suspension plate;

at least one bracket connected between the suspension plate and the outer frame for elastically supporting the suspension plate, wherein a non-coplanar structure is formed on a surface of the suspension plates and a surface of the outer frame, and a cavity space is maintained between the surface of the suspension plate and the resonance plate; and a piezoelectric element, wherein a length of a side of the piezoelectric element is smaller than or equal to a length of a side of the suspension plate, and the piezoelectric element is attached on the surface of the suspension plate to drive the suspension plate to undergo the bending vibration in response to an applied voltage.

\* \* \* \* \*